United States Patent Office 3,326,978
Patented June 20, 1967

3,326,978
PREPARATION OF UNSATURATED KETONES
Morris Dunkel, Paramus, N.J., assignor to Universal Oil Products Company, Des Plaines, Ill., a corporation of Delaware
No Drawing. Filed June 10, 1963, Ser. No. 286,489
10 Claims. (Cl. 260—593)

This invention relates to a process for preparing certain unsaturated ketones and more particularly to a process for the preparation of relatively high molecular weight unsaturated ketones.

Certain relatively high molecular weight unsaturated ketones which possess certain configurations are useful compositions of matter in the chemical field. A particularly useful compound in this category is methylheptenone and more particularly a methylheptenone in which the methyl substituent is on the 2 position, unsaturated at carbon 2–3, while the oxygen forming the ketone is on the 6 position. This particular compound is the starting material for the preparation of compounds having a polyisoprenoid structure such as:

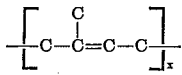

The polyisoprenoid structure is of particular importance inasmuch as they are present in many naturally occurring aroma products such as linalool, geraniol, citral, etc., these products being used in the aroma field wherein they are compounded with other organic chemicals to form the necessary scents and aromas which are used in detergents, soaps, colognes, perfumes, talcs and cosmetics. In addition, 2-methylhept-2-ene-6-one is also useful as a starting material in the preparation of ionones which in turn are used as starting material for the synthesis of Vitamin A and carotene.

Heretofore there have been a number of commercial methods for the preparation of methylheptenone having the particular configuration hereinbefore described. However, these prior art methods require the use of diketene or ethyl acetoacetate. One of the disadvantages of using these compounds is that said compounds are expensive and require elaborate methods of preparation before they can be utilized. In contradistinction to this, it has now been discovered that an unsaturated ketone of relatively high molecular weight and particularly a methylheptenone may be prepared by reacting a lower molecular weight unsaturated alcohol with a relatively lower molecular weight ketone at an elevated temperature to thus prepare the desired product.

It is therefore an object of this invention to provide a novel process for preparing unsaturated ketones.

A further object of this invention is to provide a process for preparing unsaturated ketones having a desired configuration which are useful as starting materials in other chemical processes.

Taken in its broadest aspect one embodiment of this invention resides in a process for the preparation of a higher molecular weight unsaturated ketone which comprises reacting a lower molecular weight unsaturated alcohol with a ketone at reaction conditions, and recovering the desired higher molecular weight unsaturated ketone.

A further embodiment of this invention is found in a process for the preparation of a higher molecular weight unsaturated ketone which comprises reacting a lower molecular weight unsaturated alcohol with acetone at a temperature in the range of from about 400° to about 600° C., and recovering the desired higher molecular weight unsaturated acetone.

A specific embodiment of this invention resides in a process for the preparation of methylheptenone which comprises reacting 2-methylbut-3-ene-2-ol with acetone at a temperature in the range of from about 400° to about 600° C., and recovering the desired 2-methylhept-2-ene-6-one.

Other objects and embodiments will be found in the following further detailed description of this invention.

As hereinbefore set forth, it has now been discovered that certain unsaturated ketones having relatively high molecular weight and of a particular configuration may be prepared by reacting a lower molecular weight unsaturated alcohol with a ketone at an elevated temperature. The resulting higher molecular weight unsaturated ketones which are aliphatic in nature and preferably possess a branched chain configuration in which the alkyl substituents containing only carbon and hydrogen atoms, are at the opposite end of the chain from that end which contain ketonic oxygen substituent.

Lower molecular weight unsaturated alcohols which may be utilized in the process of this invention include those having the structural formula:

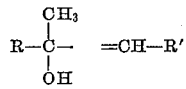

wherein R is selected from the group consisting of methyl and ethyl, and R' is selected from the group consisting of hydrogen, methyl and ethyl. Specific examples of such unsaturated alcohols include 2-methylbut-3-ene-2-ol, 2-methylpent-3-ene-2-ol, 3-methylpent-4-ene-3-ol, 2-methylhex-3-ene-2-ol, 3-methylhex-4-ene-3-ol, etc. Ketones which may be condensed with the aforementioned unsaturated alcohols according to the process of this invention include lower alkanones and lower alkanediones such as acetone, acetonylacetone, methyl ethyl ketone, diethyl ketone, methyl propyl ketone, methyl butyl ketone, ethyl propyl ketone, ethyl butyl ketone, etc. The aforementioned unsaturated alcohols and ketones are only representatives of the class of compounds which may be used and the process of the present invention is not necessarily limited thereto.

As hereinbefore set forth, the condensation or reaction between the unsaturated alcohol and ketone is effected at elevated temperatures, usually in a range of from about 400° to about 600° C. or more. In addition, the reaction is preferably conducted in an inert atmosphere which is supplied by the introduction of an inert gas such as nitrogen to the reaction zone. An example of the type of reaction contemplated in the present invention is the condensation of 2-methylbut-3-ene-2-ol and acetone at a temperature of about 500° C. according to the following equation:

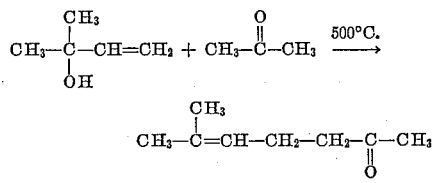

to form 2-methylhept-2-ene-6-one.

The process of the present invention may be effected in any suitable manner and may comprise either a batch or continuous type of operation. For example, when a batch type operation is used, a quantity of the starting materials comprising the unsaturated alcohol and the ketone are placed in an appropriate apparatus. Nitrogen is then pressed in to insure a substantially inert atmosphere under which the reaction will be effected. The apparatus and contents thereof are then heated to the desired temperature and maintained thereat for a predetermined period of time. Upon completion of the desired residence time, the flask and contents thereof are allowed to cool to room temperature, the apparatus is opened and the reaction product is subjected to fractional distillation whereby the desired product comprising the higher molecular weight unsaturated ketone is separated from unreacted starting materials.

It is also contemplated within the scope of this invention that the reaction herein described may be effected in a continuous manner. A reaction zone is maintained at the proper operating conditions of temperature and, if so desired, pressure, said pressure being in the range of from about atmospheric up to about 100 atmospheres or more depending upon the particular reaction temperature which is utilized. The starting materials comprising the unsaturated alcohol of lower molecular weight than the desired product and the ketone are continuously charged to this reactor which may, if so desired, contain a packing material of an inert substance such as glass beads. In addition, the reactor which has been previously purged by the charging thereto of an inert gas such as nitrogen is maintained in this condition by the continual addition of nitrogen. Upon completion of the desired residence time, the reactor effluent is withdrawn and passed to a fractionation zone wherein the unreacted starting materials are separated from the desired higher molecular weight unsaturated ketone. The former may then be recycled to form a portion of the feed stock while the latter is purified by conventional means and recovered.

The following examples are given to illustrate the process of the present invention which, however, are not intended to limit the generally broad scope of the present invention in strict accordance therewith.

EXAMPLE I

A 12 inch glass column packed with glass beads was purged by passing nitrogen through the column. A mixture of 43 grams (0.5 mole) of 2-methyl-3-butene-2-ol and 150 cc. of acetone was slowly added to the column while maintaining the column under a nitrogen atmosphere. The column and contents thereof were heated to a temperature of about 250° C., at which no reaction took place. Heating was continued and it was observed that at 300° C. and 400° C. no reaction occurred. The column was further heated and at a temperature in the range of from about 495° to about 510° C. a characteristic odor of methylheptenone was noted. After stripping off the unreacted acetone and methylbutenone a brown residual oil remained.

A portion of this oil was injected into a gas chromatographic instrument which comprised a 12 foot long copper tube packed with 20% Hyprose on Chromabsorb W. The column was operated at a temperature of about 175° C. and a helium pressure of 15 pounds per square inch gauge. Methylbutenol was first eluted followed by methylheptenone and infra-red spectrum further identified the product as 2-methylhept-2-ene-6-one.

EXAMPLE II

In this example a mixture of 43 grams (0.5 mole) of methylbutenol and 150 cc. of acetone was treated in a manner similar to that set forth in the above examples, the difference being that the column was heated to a temperature in the range of from about 555° to 560° C. The unreacted methylbutenol and acetone was stripped and a brown residual oil comprising 2-methylhept-2-ene-6-one was recovered.

EXAMPLE III

In this example a mixture of 43 grams (0.5 mole) of methylbutenol and 29 grams (0.5 mole) of acetone was also treated in a manner similar to that set forth in Example I above in a like apparatus. In this experiment the column was heated to a temperature of about 450° C. Upon completion of the desired residence time, only a trace of methylheptenone was recovered.

EXAMPLE IV

In this example a mixture of 86 grams (1.0 mole) of methylbutenol and 57 grams (0.5 mole) of acetonylacetone was charged to a glass column which had been purged by passing nitrogen through the column and thereafter reacted also in the presence of nitrogen at a temperature of 500° C. The unreacted methylbutenol and acetonylacetone was stripped off and the desired product comprising 2-methylhept-2-ene-6-one was recovered and identified in a manner similar to that set forth in Example I above.

EXAMPLE V

In this experiment similar quantities of methylbutenol and acetonylacetone were reacted in a manner similar to that set forth in Example IV, the only difference being that the temperature of the column was maintained at about 400° C. However, upon completion of the reaction, only a trace of 2-methylpent-2-ene-6-one was identified on a gas chromatographic apparatus.

It is therefore evident from the above examples that a relatively high molecular weight unsaturated ketone can be prepared by condensing an unsaturated alcohol or lower molecular weight with a saturated ketone at temperatures in the range of from about 400° to about 600° C., temperatures lower than the aforementioned 500° C. resulting in the obtention of only trace amounts of the desired product.

I claim as my invention:

1. A process for the preparation of a higher molecular weight unsaturated ketone which comprises reacting, at a temperature of from about 400° to about 600° C., a ketone selected from the group consisting of lower alkanones and lower alkanediones with an unsaturated alcohol having the formula:

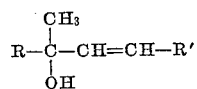

wherein R is selected from the group consisting of methyl and ethyl, and R' is selected from the group consisting of hydrogen, methyl and ethyl; and recovering the desired higher molecular weight unsaturated ketone.

2. The process of claim 1 further characterized in that said unsaturated alcohol is 2-methylbut-3-ene-2-ol.

3. The process of claim 1 further characterized in that said unsaturated alcohol is 2-methylpent-3-ene-2-ol.

4. The process of claim 1 further characterized in that said ketone is acetone.

5. The process of claim 1 further characterized in that said ketone is acetonylacetone.

6. The process of claim 1 further characterized in that said ketone is methyl ethyl ketone.

7. A process for the preparation of methylheptenone which comprises reacting 2-methylbut-3-ene-2-ol with actone at a temperature in the range of from about 400° to about 600° C., and recovering the desired 2-methylhept-2-ene-6-one.

8. A process for the preparation of methylheptenone which comprises reacting 2-methylbut-3-ene-2-ol with acetonylacetone at a temperature in the range of from about 400° to about 600° C., and recovering the desired 2-methylhept-2-ene-6-one.

9. A process for the preparation of methyloctenone which comprises reacting 2-methylpent-3-ene-2-ol with acetone at a temperature in the range of from about 400° to about 600° C., and recovering the desired ketone.

10. A process for the preparation of methyloctenone which comprises reacting 2-methylpent-3-ene-2-ol with acetonylacetone at a temperature in the range of from about 400° to about 600° C., and recovering the desired ketone.

References Cited
FOREIGN PATENTS 606,228    7/1960    Italy.

LEON ZITVER, *Primary Examiner.*

DANIEL D. HORWITZ, *Examiner.*